US011461128B2

(12) United States Patent
Barnes

(10) Patent No.: US 11,461,128 B2
(45) Date of Patent: Oct. 4, 2022

(54) APPARATUS AND METHOD FOR MANAGING USE OF CAPABILITIES

(71) Applicant: ARM LIMITED, Cambridge (GB)

(72) Inventor: Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 420 days.

(21) Appl. No.: 16/606,400

(22) PCT Filed: Apr. 19, 2018

(86) PCT No.: PCT/GB2018/051029
§ 371 (c)(1),
(2) Date: Oct. 18, 2019

(87) PCT Pub. No.: WO2018/203031
PCT Pub. Date: Nov. 8, 2018

(65) Prior Publication Data
US 2020/0133710 A1    Apr. 30, 2020

(30) Foreign Application Priority Data

May 5, 2017   (GB) ..................................... 1707182

(51) Int. Cl.
G06F 9/46   (2006.01)
G06F 9/38   (2018.01)
G06F 9/48   (2006.01)

(52) U.S. Cl.
CPC ............ *G06F 9/468* (2013.01); *G06F 9/3861* (2013.01); *G06F 9/4812* (2013.01); *G06F 2209/481* (2013.01)

(58) Field of Classification Search
CPC ...... G06F 9/468; G06F 9/3861; G06F 9/4812; G06F 9/3013; G06F 9/30192; G06F 9/35; G06F 2209/481; G06F 12/1491
See application file for complete search history.

(56) References Cited

U.S. PATENT DOCUMENTS

| 4,809,160 A | 2/1989 | Mahon et al. |
| 2004/0122834 A1 | 6/2004 | Durrant |

(Continued)

FOREIGN PATENT DOCUMENTS

| CN | 101911016 | 5/2014 |
| EP | 2 885 738 | 6/2015 |
| TW | 201415287 | 4/2014 |

OTHER PUBLICATIONS

International Search Report and Written Opinion of the ISA for PCT/GB2018/051029, dated Jul. 6, 2018, 14 pages.

(Continued)

*Primary Examiner* — Glenn A. Auve
(74) *Attorney, Agent, or Firm* — Nixon & Vanderhye P.C.

(57) ABSTRACT

An apparatus and method are provided for managing use of capabilities. The apparatus has processing circuitry to execute instructions, and a plurality of capability storage elements accessible to the processing circuitry and arranged to store capabilities used to constrain operations performed by the processing circuitry when executing instructions. The processing circuitry is operable at a plurality of exception levels, each exception level having different software execution privilege. Further, capability configuration storage is provided to identify capability configuration information for each of the plurality of exception levels. For each exception level, the capability configuration information identifies at least whether the operations performed by the processing circuitry when executing instructions at that exception level are constrained by capabilities. During a switch operation from a source exception level to a target exception level, the capability configuration information in the capability configuration storage pertaining to at least one of the source exception level and the destination exception level is used to determine how execution state of the processing circuitry is (Continued)

managed during the switch operation. This provides a great deal of flexibility in the management of capabilities.

23 Claims, 10 Drawing Sheets

(56) References Cited

U.S. PATENT DOCUMENTS

| | | | |
|---|---|---|---|
| 2015/0347052 | A1 | 12/2015 | Grisenthwaite et al. |
| 2016/0170912 | A1 | 6/2016 | Warkentin et al. |
| 2017/0097898 | A1 | 4/2017 | Durham et al. |
| 2018/0196746 | A1* | 7/2018 | Craske .................. G06F 9/3013 |
| 2018/0349294 | A1* | 12/2018 | Barnes .................... G06F 9/324 |
| 2019/0012455 | A1* | 1/2019 | Barnes ................ G06F 9/30105 |

OTHER PUBLICATIONS

Combined Search and Examination Report for GB 1707182.0, dated Oct. 10, 2017, 6 pages.

Office Action for EP Application No. 18721113.1 dated Nov. 19, 2021, 12 pages.

Robert N.M. Watson et al., "CHERI: A Hybrid Capability-System Architecture for Scalable Software Compartmentalization" 2015 IEEE Symposium on Security and Privacy, May 2015, 18 pages.

Robert N.M. Watson et al., "Capability Hardware Enhanced RISC Instructions: CHERI Instruction-Set Architecture" University of Cambridge Computer Laboratory, Technical Report No. 876, Sep. 2015, 198 pages.

Robert N.M. Watson et al., "Capability Hardware Enhanced RISC Instructions: CHERI Instruction-Set Architecture (Version 6)" University of Cambridge Computer Laboratory, Technical Report No. 907, Apr. 2017, 307 pages.

Office Action for TW Application No. 107115029 dated Nov. 26, 2021 and English translation, 20 pages.

Office Action for IN Application No. 201947048842 dated Feb. 11, 2022, 9 pages.

Office Action for JP Application No. 2019-558718 dated Mar. 2, 2022 and English translation, 3 pages.

* cited by examiner

A) SET   PR1 = 140000   ⟶ trigger error

B) SET   PR1 = 140000

LD   R5,  PR1   ⟶ trigger error

PER EL CAPABILITY CONFIGURATION

| | MANAGE CAPABILITIES (M BIT) 310 | AFFECTED BY CAPABILITIES (A BIT) 305 | SOFTWARE EXECUTING AT EL |
|---|---|---|---|
| | 0 | 0 | LEGACY |
| | 1 | 0 | MANAGE CAPABILITIES THAT MAY BE USED TO AFFECT LOWER EXCEPTION LEVELS |
| | 1 | 1 | MANAGE CAPABILITIES AND AFFECTED BY CAPABILITIES |
| OPTION FOR EL0 | 0 | 1 | OPTIONAL STATE FOR EL0 (S/W IS AFFECTED BY CAPABILITIES BUT DOES NOT MANAGE CAPABILITIES) |

| M BIT FOR $EL_P$ (325) | A BIT FOR $EL_P$ (330) | M BIT FOR $EL_Q$ (335) | A BIT FOR $EL_Q$ (340) |
|---|---|---|---|
| 0 | TO BE TREATED AS 0 | TO BE TREATED AS 0 | TO BE TREATED AS 0 |
| 1 | 0 | 0 | TO BE TREATED AS 0 (OPTIONALLY CAN BE 1 FOR EL0) |
| 1 | 0 | 1 | 0 |
| 1 | 0 | 1 | 1 |
| 1 | 1 | 0 | TO BE TREATED AS 0 (OPTIONALLY CAN BE 1 FOR EL0) |
| 1 | 1 | 1 | 0 |
| 1 | 1 | 1 | 1 |

APPARATUS AND METHOD FOR MANAGING USE OF CAPABILITIES

This application is the U.S. national phase of International Application No. PCT/GB2018/051029 filed 19 Apr. 2018, which designated the U.S. and claims priority to GB Patent Application No. 1707182.0 filed 5 May 2017, the entire contents of each of which are hereby incorporated by reference.

The present technique relates to an apparatus and method for managing use of capabilities.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer"). For a bounded pointer, the pointer value may identify, or be used to determine, the address of a data value to be accessed or an instruction to be executed, for example. However, the pointer value may also have associated range information which indicates an allowable range of addresses when using the pointer value, and may additionally have permissions/restrictions information associated therewith. The range information and any permissions/restrictions information for a bounded pointer may be referred to as capability information, and within a capability-based architecture such a bounded pointer (including its associated capability information) may be referred to as a capability.

Whilst the use of capabilities can be useful in maintaining security and/or functional correctness of behaviour of software executing on a processor, it may be desirable in some instances to allow certain software (e.g. that is "trusted") to execute either unconstrained by capabilities, or in a less constrained manner. It would hence be desirable to provide a technique that allowed the use of capabilities to be managed in order to provide such flexibility.

In a first example configuration, there is provided an apparatus comprising: processing circuitry to execute instructions, the processing circuitry being operable at a plurality of exception levels, each exception level having different software execution privilege; a plurality of capability storage elements accessible to the processing circuitry and arranged to store capabilities used to constrain operations performed by the processing circuitry when executing said instructions; and capability configuration storage to identify capability configuration information for each of said plurality of exception levels, for each exception level the capability configuration information identifying at least whether the operations performed by the processing circuitry when executing instructions at that exception level are constrained by said capabilities; and during a switch operation from a source exception level to a target exception level, the capability configuration information in the capability configuration storage pertaining to at least one of the source exception level and the destination exception level is used to determine how execution state of the processing circuitry is managed during the switch operation.

In another example configuration, there is provided a method of managing use of capabilities within an apparatus having processing circuitry to execute instructions, the processing circuitry being operable at a plurality of exception levels, each exception level having different software execution privilege, and a plurality of capability storage elements accessible to the processing circuitry and arranged to store capabilities used to constrain operations performed by the processing circuitry when executing said instructions, the method comprising: identifying, within capability configuration storage, capability configuration information for each of said plurality of exception levels, for each exception level the capability configuration information identifying at least whether the operations performed by the processing circuitry when executing instructions at that exception level are constrained by said capabilities; and during a switch operation from a source exception level to a target exception level, using the capability configuration information in the capability configuration storage pertaining to at least one of the source exception level and the destination exception level to determine how execution state of the processing circuitry is managed during the switch operation.

In a yet further example configuration, there is provided an apparatus comprising: processing means for executing instructions, the processing means being operable at a plurality of exception levels, each exception level having different software execution privilege; a plurality of capability storage element means accessible to the processing means and for storing capabilities used to constrain operations performed by the processing means when executing said instructions; and capability configuration storage means for identifying capability configuration information for each of said plurality of exception levels, for each exception level the capability configuration information identifying at least whether the operations performed by the processing means when executing instructions at that exception level are constrained by said capabilities; and during a switch operation from a source exception level to a target exception level, the capability configuration information in the capability configuration storage means pertaining to at least one of the source exception level and the destination exception level is used to determine how execution state of the processing means is managed during the switch operation.

In a still further example configuration, there is provided a virtual machine computer program comprising program instructions to control a host data processing apparatus to provide an instruction execution environment corresponding to the apparatus of the first example configuration discussed above. In one embodiment a computer-readable storage medium may be provided for storing the virtual machine computer program.

The present technique will be described further, by way of example only, with reference to embodiments thereof as illustrated in the accompanying drawings, in which:

FIG. 5 illustrates one form of per exception level capability configuration information that may be provided in accordance with one embodiment;

FIG. 6 is a table illustrating possible options for the capability configuration information for two different exception levels in accordance with one embodiment;

Figure 1:
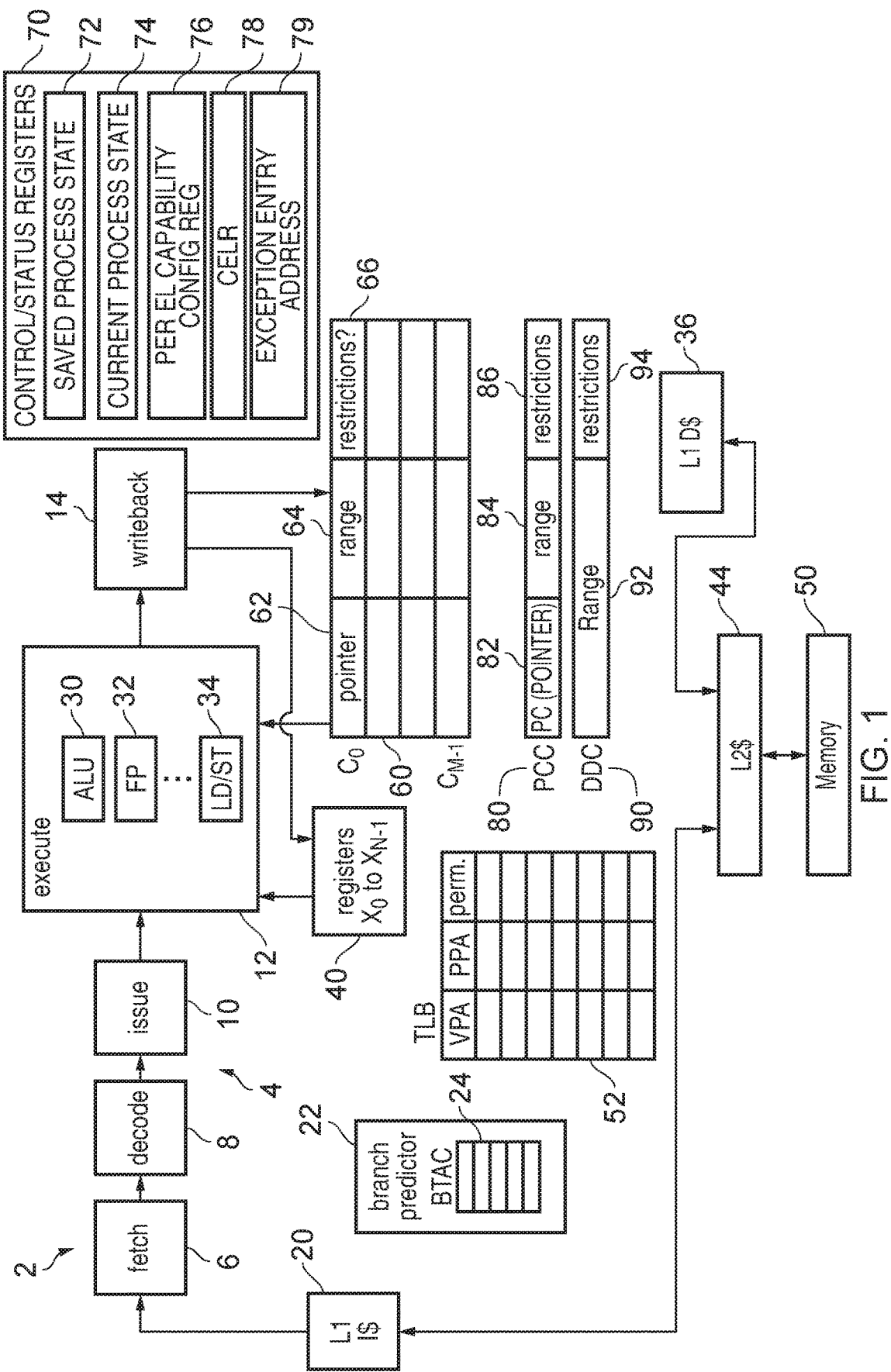
FIG. 1 is a block diagram of an apparatus in accordance with one embodiment.

Before discussing the embodiments with reference to the accompanying figures, the following description of embodiments is provided.

As mentioned earlier, there is an increasing interest in capability-based architectures in which certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information). An apparatus adopting such a capability-based architecture will typically have storage elements (also referred to herein as bounded pointer storage elements, or more generally capability storage elements) that are used to store the capabilities. The storage elements can be registers (also referred to herein as bounded pointer registers or capability registers) and/or can be memory locations in general purpose memory, for example a location on a stack memory. Certain instructions can be used to reference such storage elements in order to access a desired capability, and perform operations dependent on that capability. For example, considering a bounded pointer, execution of such an instruction can cause the bounded pointer to be retrieved, and for the pointer value therein to then be used to derive an address in memory required during execution of the instruction. The pointer value may be used directly to identify the memory address, or may be used to derive the memory address, for example by the addition of an offset to the pointer value. The operation will then be allowed to proceed provided that the memory address is within the range specified by the range information, and any permissions specified in the permissions information are met.

By adopting such a capability-based architecture, it is possible to increase resilience to software attacks, due to the constraints that capabilities can place on the operations performed by the processing circuitry when executing instructions. However, it may be also be desirable in some instances to allow certain software to execute either unconstrained by capabilities, or in a less constrained manner. This can provide significantly enhanced flexibility, and can also in some instances allow for backwards compatibility, by allowing capability-unaware code to be executed on the processing apparatus.

It is known in some existing systems to arrange processing circuitry so that it can operate at different exception levels, where each exception level has different software execution privilege. In the embodiments described herein, a flexible technique for managing the use of capabilities has been developed for use with processing circuitry of the type that allows operation at multiple exception levels.

In particular, in one embodiment an apparatus is provided that comprises processing circuitry operable at a plurality of exception levels, and a plurality of capability storage elements accessible to the processing circuitry. The capability storage elements are arranged to store capabilities used to constrain operations performed by the processing circuitry when executing instructions.

In addition, capability configuration storage is provided that is arranged to identify capability configuration information for each of the plurality of exception levels. In particular, for each exception level the capability configuration information identifies at least whether the operations performed by the processing circuitry when executing instructions at that exception level are constrained by the capabilities. This hence provides the flexibility to allow software at at least one exception level to be unconstrained by capabilities if desired. As a particular example, highly trusted software executing at a high exception level may be allowed to operate unconstrained by capabilities. This can give rise to performance benefits by avoiding the need to perform capability checking routines for such software. It can also reduce the extent to which such software needs to be modified to make it compatible with capability-based architectures. However, since such flexibility can be managed on a per exception level basis, such a mechanism can still be used to ensure that the full constraints of capabilities are imposed on software executing at one or more of the exception levels.

Having allowed the effects of capabilities to be varied on a per exception level basis, the apparatus also provides a mechanism for switching between exception levels that takes account of the possibility that the effects of capabilities are different between the source exception level and the target exception level. In particular, during a switch operation from a source exception level to a target exception level, the capability configuration information in the capability configuration storage pertaining to at least one of the source exception level and the destination exception level is used to determine how execution state of the processing circuitry is managed during the switch operation.

Hence, through use of the described embodiments, it is possible to define the effects of capabilities on a per exception level basis, whilst providing an effective mechanism for switching between exception levels to ensure that those potentially differing effects are considered during the switch operation.

The switch operation can be performed in a variety of ways. However, in one embodiment, the processing circuitry is arranged to use an exception mechanism to transition between said plurality of exception levels, and when exception entry causes the switch operation from the source exception level to the destination exception level, the processing circuitry is arranged to determine return address information to be preserved for the source exception level with reference to the capability configuration information pertaining to the source exception level.

There are a number of ways in which the capability configuration information pertaining to the source exception level can be used. However, in one embodiment, when the capability configuration information pertaining to the source exception level identifies that the operations performed by the processing circuitry when executing instructions at said source exception level are constrained by capabilities, the processing circuitry is arranged to determine the return address information with reference to a program counter capability, and to store the return address information as a capability within one of the capability storage elements designated as a return address capability storage element. Otherwise (i.e. if the source exception level is not constrained by capabilities), the processing circuitry is arranged to determine said return address information with reference to a program counter value, and to store the return address information as a return address value within a return address storage element. Hence, when the operations performed at the source exception level are constrained by capabilities, a return address capability is determined and stored within a return address capability storage element. However, if this is not the case, then a return address capability is not required, and instead the return address information can be stored in a non-capability form as a return address value within a return address storage element.

Whilst in one embodiment the return address capability storage element may be entirely physically separate to the return address storage element, in an alternative embodiment these two storage elements can share the same physical structure. In particular, in one embodiment the return address storage element may be formed by a field within the return address capability storage element. For example, the pointer field within the return address capability storage element used to store the return address value information for the capability may also be reused to form the return address storage element when a capability is not required.

In one embodiment where the return address storage element and the return address capability storage element share the same physical structure, and the source exception level is not constrained by capabilities, then at least one of the remaining fields of the return address capability storage element (that is not used to store the return address information) is set to a first default value. For example, in one embodiment, each capability may include a tag bit which is set to identify that the remaining fields represent a valid capability, and which is cleared to identify when the remaining fields do not store a valid capability. In one such embodiment, the tag bit may be cleared to identify that the contents do not represent a capability, and in that instance only the pointer field will be referenced, providing the return address information.

In an alternative embodiment, all of the remaining fields are set to the first default value, and in one embodiment this can be achieved by zero extending the return address value that is written to the return address capability storage element.

In one embodiment, when exception entry causes the switch operation from the source exception level to the destination exception level, the processing circuitry may be arranged to determine an initial execution state of the processing circuitry for the destination exception level with reference to the capability configuration information pertaining to the destination exception level.

There are a number of ways in which the capability configuration information pertaining to the destination exception level can be used for this purpose. However, in one embodiment, when the capability configuration information pertaining to the destination exception level identifies that the operations performed by the processing circuitry when executing instructions at said destination exception level are constrained by capabilities, the processing circuitry is arranged to generate an initial program counter capability for the destination exception level using exception entry address capability information stored in a capability control storage element. Otherwise (i.e. if the destination exception level is not constrained by capabilities), the processing circuitry is arranged to generate an initial program counter value using exception entry address information stored in a control storage element.

Hence, when it is known that operations performed at the destination exception level will be constrained by capabilities, an initial program counter capability can be generated for the destination exception level. The capability control storage element referenced in such a situation can take a variety of forms, but in one embodiment is a capability vector base address register (CVBAR). In one particular embodiment, the CVBAR register provides a base address for exception entry, and the exception determines an offset from this base address in dependence on the exception type. For example, in one implementation the exception type is multiplied by 128, and that value is added to the base address in the address field of the capability in the CVBAR to produce the initial address of the program counter capability. The remaining portion of the capability information for the program counter capability, such as the range and permissions information, will also be extracted from the capability held within the CVBAR.

When it is instead determined that operations performed at the destination exception level will not be constrained by capabilities, then it is merely necessary to generate an initial program counter value, which can be unconstrained by associated capability information. In one such embodiment, the initial program counter value is determined in such situations using exception entry address information in a (non-capability) control storage element. In one particular embodiment, the control storage element takes the form of a vector base address register, this being a non-capability variant of the CVBAR mentioned earlier.

Whilst in one embodiment the control storage element and the capability control storage element may be physically separate structures, in one embodiment they can share the same physical structure. For example, in one embodiment the control storage element may be formed by a field within the capability control storage element, and hence for example can provide a base address for exception entry, but unconstrained by associated capability information.

In one embodiment, the apparatus may comprise a program counter capability storage element to store the initial program counter capability. When a program counter capability is not used, and instead a simple program counter value is required, there are a number of ways in which that program counter value can be maintained. However, in one embodiment the processing circuitry is arranged, when generating the initial program counter value instead of the initial program counter capability, to store the initial program counter value within a first field of the program counter capability storage element.

There are a number of ways in which the remaining fields of the program counter capability storage element can be managed in such a situation. If the processing circuitry hardware is configured in such instances to ignore the remaining fields of the program counter capability storage element, then the remaining fields could for example be left unchanged, or could be cleared. However, in an alternative embodiment where the processing circuitry will always refer to the entirety of the program counter capability storage element, the remaining fields of the program counter capability storage element may be arranged to be set to a second default value when only a program counter value is stored within the program counter capability storage element.

That second default value can take a variety of forms, but in one embodiment causes the program counter capability storage element to represent a maximum capability for the processing circuitry, to ensure that the processing circuitry's use of the program counter value is unconstrained by the content of the program counter capability storage element. This can provide a simple and effective mechanism for allowing the same program counter structure to be used irrespective of whether, at the current exception level, operations will be affected by capabilities or not.

In addition to the above described mechanisms for handling exception entry, the described embodiments may also provide a mechanism associated with exception exit (also referred to herein as exception return). In particular, when exception exit causes the switch operation from the source exception level to the destination exception level, then in one embodiment the processing circuitry is arranged to determine a return execution state of the processing circuitry for the destination exception level with reference to the capability configuration information pertaining to the destination exception level.

The return execution state of the processing circuitry can be determined in a variety of ways. However, in one embodiment, when the capability configuration information pertaining to the destination exception level identifies that the operations performed by the processing circuitry when executing instructions at said destination exception level are constrained by capabilities, the processing circuitry is arranged to generate a return program counter capability for the destination exception level using return address information stored as a capability within one of said capability storage elements designated as a return address capability storage element. Otherwise (i.e. if the destination exception level is not constrained by capabilities), the processing circuitry is arranged to generate a return program counter value using return address information stored as a return address value within a return address storage element.

Hence, when the destination exception level will be constrained by capabilities, a return program counter capability is generated, whereas otherwise a return program counter value is generated. In one such embodiment, a program counter capability storage element is used in both instances to store either the return program counter capability or the return program counter value, and when it is used to store the return program counter value, that return program counter value is stored within a first field of the program counter capability storage element. As with the earlier described exception entry mechanism, if in the latter case (i.e. when a program counter capability is not required) the hardware will not refer to the remaining portions of the program counter capability storage element, then those remaining portions can either be left "as is" or cleared. However, in an alternative embodiment the remaining fields of the program counter capability storage element are arranged to be set to a third default value, and in one particular embodiment that third default value causes the program counter capability storage element to represent a maximum capability for the processing circuitry, to ensure that the processing circuitry's use of the program counter value is unconstrained by the content of the program counter capability storage element.

The plurality of exception levels can take a variety of forms, but in one embodiment are arranged as a hierarchy of exception levels, such that software executing at a higher exception level in the hierarchy has ability to constrain at least some behaviour of software executing at a lower exception level in the hierarchy. In one such embodiment, for each exception level the capability configuration information is arranged to further identify whether software executing at that exception level is able to manage capabilities used to constrain the operations performed by the processing circuitry when executing instructions at at least one of the same exception level and a lower exception level.

In some embodiments, the additional information stored within the capability configuration information will merely indicate whether software executing at a particular exception level can manage capabilities used to constrain operations performed at a lower exception level. However, in some embodiments that same information may also be used to identify whether the software executing at a particular exception level can additionally manage capabilities used to constrain the operations performed at that same exception level. Furthermore, for the lowest exception level in the hierarchy, the capability management information within the capability configuration information may merely identify whether that lowest exception level can manage capabilities used to constrain operations at that lowest exception level or not.

In one embodiment, when the capability configuration information for a particular exception level identifies that that particular exception level is unable to manage capabilities, then at least when the particular exception level is an exception level other than a lowest exception level the capability configuration information for said particular exception level will further identify that the operations performed by the processing circuitry when executing instructions at said particular exception level are unconstrained by said capabilities. Hence, for any exception level other than the lowest exception level, if the capability configuration information indicates that that exception level cannot manage capabilities, the capability configuration information for that exception level will also identify that operations performed at that exception level are unconstrained by capabilities. Hence, with the possible exception of the lowest exception level, if a predetermined exception level cannot manage capabilities, then it also cannot be affected by capabilities in the described embodiments. The same may also be true of the lowest exception level, but in an alternative embodiment it can be arranged that the lowest exception level can still be affected by capabilities, even it cannot manage capabilities.

Further, in one embodiment, when the capability configuration information for a particular exception level identifies that that particular exception level is unable to manage capabilities, it will also be the case that the capability configuration information for each lower exception level will identify that that lower exception level cannot manage capabilities. Furthermore, at least when that lower exception level is an exception level other than the lowest exception level, the capability configuration information for that lower exception level will further identify that the operations performed by the processing circuitry at that lower exception level are unconstrained by capabilities. As mentioned earlier, this constraint may also apply for the lowest exception level, but in one embodiment the lowest exception level can be arranged to still be affected by capabilities.

Particular embodiments will now be described with reference to the Figures.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
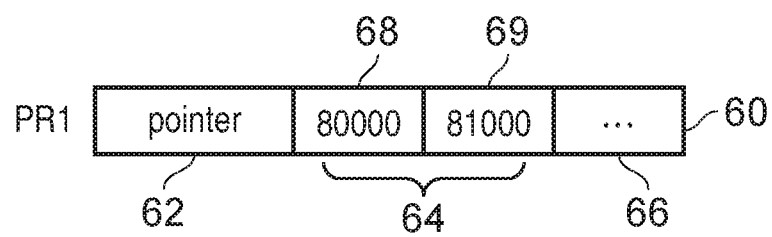
FIG. 2 shows examples of types of instruction for which an error may be triggered if there is an attempt to set or access a pointer value within a set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception levels of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Further, in one embodiment non-bounded pointers may also be specified within the general purpose registers 40 and used when performing memory accesses. To limit memory addresses that may be accessed using such non-bounded pointers, a Default Data Capability (DDC) register 90 may be provided that specifies both range information 92 and any restriction data 94, similar to the range and restriction information included within any of the capability registers. Then, when a memory access instruction is executed that identifies a memory address with reference to a non-bounded pointer in a general purpose register 40, a bound check operation similar to the bound check operation performed in respect of bounded pointers can still be performed based on any address derived from that non-bounded pointer, but in this instance having regards to the range and restriction information held within the DDC register 90. By such an approach, it is possible for example for capability aware code that wishes to utilise some capability unaware code in an existing software library to set the DDC register 90 so as to place constraints on how pointers accessed from the general purpose register 40 are used when executing that capability unaware code. In particular, the range information can be used to limit the address range that can be accessed when executing such capability unaware code.

Any particular range of memory addresses identified by a bounded pointer within a bounded pointer register may contain data, instructions and/or other capabilities (i.e. other bounded pointers). Hence, it will be appreciated that at any point in time the processing circuitry's ability to access memory is defined by a set of capabilities comprising the capabilities identified in the bounded pointer registers and any further capabilities accessible via the capabilities held in those bounded pointer registers, and this set of capabilities will be referred to herein as a capability domain.

The range information and any associated restrictions specified in the PCC register 80 or the DDC register 90 can be set in a variety of ways. However, in one embodiment that information is determined using one or more of the bounded pointers available to the processing circuitry in a current capability domain, so that no memory address can be accessed using PCC or DDC based bound checks that resides outside the memory address range(s) identified for the current capability domain.

Figure 3:
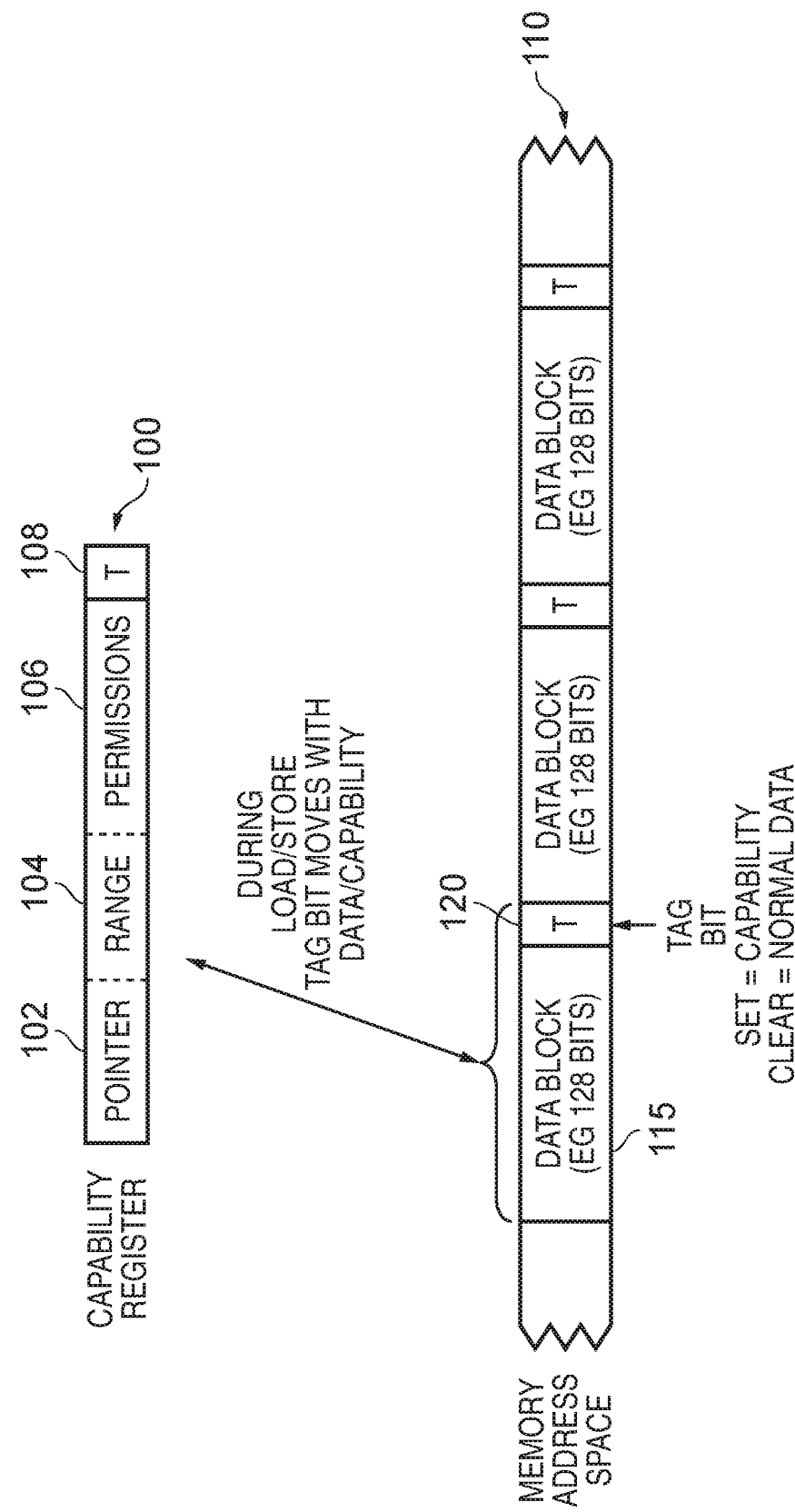
FIG. 3 illustrates the use of tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

In the illustrated embodiments, the apparatus is arranged so that it can operate at different exception levels, where each exception level has different software execution privilege. Further, an exception mechanism is used to transition between the plurality of exception levels. In particular, during exception entry or exception exit, a switch operation can be performed to switch from a source exception level to a target exception level. As shown in FIG. 1, the apparatus 10 has access to a variety of control/status registers 70 which store various control and status information referenced by the processing circuitry during its operation, the control/status registers 70 including a variety of registers that are used during performance of the above-mentioned switch operation.

As shown in FIG. 1, current process state 74 is maintained within the control/status registers 70, to capture a variety of execution state information relating to the processor's current operation. While shown as a single box 74, the current process state will not necessarily all be stored within a single register, but may be stored within a number of control and status registers within the available control/status registers 70.

During operation, an exception may be triggered by a variety of different mechanisms, for example an interrupt, a system call, a fault, etc. In accordance with one embodiment, when an exception is taken, an exception entry mechanism is triggered as part of the switch operation, and during this process the current process state 74 is captured as saved process state 72. Again, the saved process state 72 may be stored within a single register, or within multiple registers. An exception handling operation is then performed by the processing circuitry to process the exception. When the processing circuitry subsequently returns from the exception, the saved process state will be restored into the current process state, allowing the processing circuitry to continue the operations that it was performing prior to the exception being taken.

To enable execution state of the processing circuitry to be maintained for multiple exception levels, separate saved process state registers (SPSRs) 72 and current process state registers (CPSRs) 74 can be maintained for multiple of the exception levels if desired.

Figure 4:
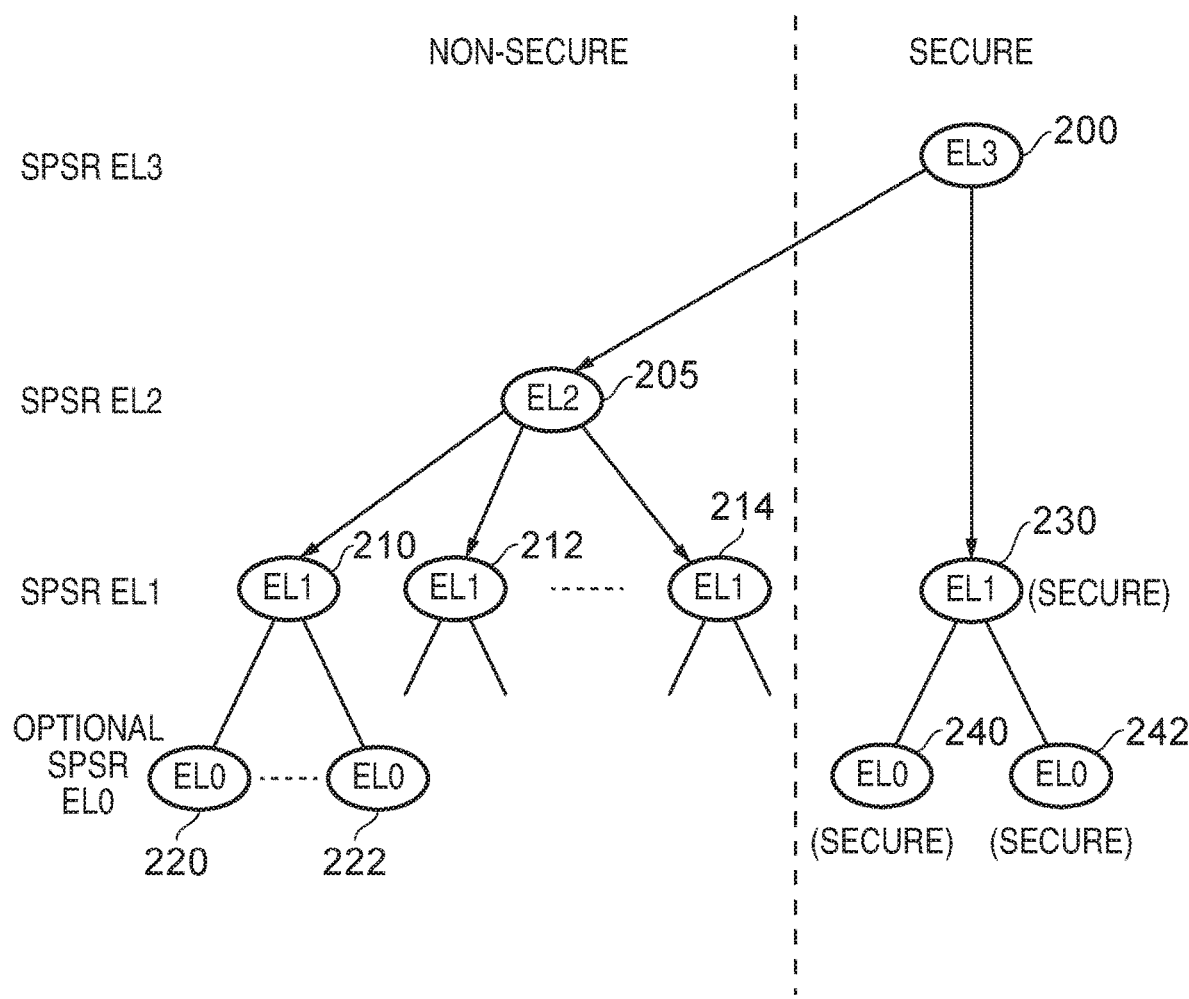
FIG. 4 illustrates how multiple exception levels may be provided in accordance with one embodiment.

FIG. 4 illustrates the interrelationship between the various exception levels in one embodiment. The exception level EL0 has the lowest software execution privilege, and execution at EL0 is called unprivileged execution. Increased values of n, from 1 to 3, indicate increased software execution privilege. The EL2 exception level provides support for processor virtualisation. Meanwhile the EL3 stage provides support for two security states, namely the secure and the non-secure states.

This gives rise to the general tree structure shown in FIG. 4. In particular, if an EL3 exception level is provided, such as EL3 200 shown in FIG. 4, it will run in a secure state. In the non-secure state, it is possible if desired to support virtualisation, and accordingly an EL2 exception level 205 may be provided in the non-secure state. Within the secure state, in one embodiment, an EL2 level is not provided, and instead an EL1 level 230 may be provided within the secure state, under which a number of different EL0 levels 240, 242 may be provided.

In the non-secure state, if an EL2 level 205 is provided, it may support beneath that multiple EL1 levels 210, 212, 214, and each of those EL1 levels may support one or more EL0 levels, as shown schematically by the reference numerals 220, 222.

Transitions between the various exception levels take place via the taking of exceptions. However, not all exceptions will cause the exception level to change. For example, in one embodiment exceptions from EL0 are usually taken in EL1 (although in some configurations EL2). Exceptions from EL1 and above may in one embodiment generally be taken in the same exception level. However, various exceptions from EL1 to EL2/EL3 and from EL2 to EL3 may also be provided and can be used for a similar purpose. Exceptions in EL3 are always taken in EL3 in one embodiment. As shown in FIG. 4, saved process state registers can be provided in association with each of the exception levels. If it is always the case that exceptions from EL0 are taken in EL1, then there is no need for a separate SPSR in association with the EL0 level. However, in one embodiment it may be arranged that certain exceptions from EL0 can be taken in the EL0 level, and in that event a separate SPSR register for EL0 may be provided.

As will be described with reference to the remaining figures, in the embodiments described herein a flexible technique for managing the use of capabilities has been developed for use with processing circuitry of the type that allows operation at multiple exception levels.

In particular, as shown in FIG. 1 the control/status register 70 include per exception level capability configuration register(s) 76 for storing capability configuration information for each exception level. The capability configuration information can capture a variety of different types of information, but in one embodiment identifies at least whether operations performed by the processing circuitry when executing instructions at that exception level are constrained by capabilities or not.

By being able to specify such capability configuration information on an exception level-by-exception level basis, this provides the flexibility to allow software at at least one exception level to be unconstrained by capabilities if desired. Hence, for example, highly trusted software executing at a high exception level may be allowed to operate unconstrained by capabilities, which can give rise to performance benefits by avoiding the need to perform capability checking routines for such software. It can also reduce the extent to which such software needs to be modified to make it compatible with capability-based architectures. Indeed, in some embodiments the mechanism can allow legacy, capability-unaware, software to be executed at at least one exception level.

FIG. 5 is a table schematically illustrating the per exception level capability configuration information captured within the register(s) 76 in accordance with one embodiment. In this embodiment, the registers 300 may comprise a two bit field for each exception level. The first field 305 can identify whether the associated exception level is affected by capabilities, this field also being referred to herein as the "A" bit. Hence, this bit identifies whether, when software is executing at the associated exception level, that software is or is not constrained by capabilities. In the example illustrated in FIG. 5, a value of "0" indicates that the software is not constrained by capabilities, and a value of "1" indicates that it is constrained by capabilities. However, it will be appreciated that in other embodiments the meaning of a logic zero value and a logic one value can be reversed if desired.

Whilst in one embodiment the per exception level capability configuration information may comprise only the field 305, in an alternative embodiment an additional field 310 is provided to identify whether software executing at the associated exception level can manage capabilities that are then used to constrain operations performed by the processing circuitry at one or more lower exception levels. Optionally, this information may also identify whether the software executing at a particular exception level can also manage capabilities used to constrain operations performed by the processing circuitry at the same exception level. For example, in one embodiment it may be possible to arrange for software executing at a particular exception level to be executed in different "compartments", with the software executing in one compartment being able to manage capabilities that are then used to constrain operations performed by the software executing in another compartment. As a particular example, the software executing at a particular exception level may be able to operate in an executive state, or a restricted state, and software executing in one compartment in the executive state may be allowed to manage capabilities that are then used to constrain software executing in another compartment at the same exception level.

As shown in FIG. 5, the field 310 that is used to capture information about the ability of software executing at a particular exception level to manage capabilities may in one embodiment be referred to as the "M" bit.

As shown in FIG. 5, if both the A bit and the M bit are cleared, then this means that the software executing at the associated exception level may be legacy software, since that software is not only unaffected by capabilities, but also is unable to manage capabilities, and accordingly need not be modified to take into account the capability-based architecture of the apparatus.

As also shown in FIG. 5, another optional state is for the A bit to be cleared, but for the M bit to be set. This means that the software executing at the associated exception level is not affected by capabilities itself, but can be used to manage capabilities that are then used to constrain the operations performed by software executing at lower exception levels.

As another option, both the A bit and the M bit can be set. This means that the software executing at the associated exception level is affected by capabilities itself, and also is able to manage capabilities. As mentioned earlier, when the M bit is set this may in one embodiment indicate that the software executing at the associated exception level can manage capabilities that are then used to constrain operations performed by software at lower exception levels, but it may be that the software cannot manage capabilities for the same exception level. However, in an alternative embodiment it may also be allowed to manage, in some situations, the capabilities associated with the same exception level.

In one embodiment, only the first three sets of entries shown in FIG. 5 are valid states for the A and M bits. However, in an alternative embodiment, a further set of states as shown by the final entry in the table 300 may be available in some instances, for example in association with the lowest exception level EL0. In particular, in accordance with this state, the M bit is cleared but the A bit is set. This means that the software executing at that exception level cannot manage capabilities, but can be constrained by them. This may be an appropriate configuration to allow for the lowest exception level EL0, where there are no lower exception levels to be managed. As a particular concrete example, this would allow software executing at EL0 to be constrained by capabilities such as the program counter capability 80 and the DDC 90, typically after those capabilities have been set up by a higher exception level.

In one embodiment, the per exception level capability configuration registers 76 can be considered to be formed of a plurality of registers, each register "owned" by an associated exception level and containing the A and M bits for that exception level. These registers are accessed explicitly, with higher exception levels having access to the registers at that level and below. For example, the EL2 exception level has access to the capability configuration registers affecting EL2, EL1 and EL0. In one particular embodiment, the capability configuration for EL0 is itself configurably controlled by registers owned by either EL1 or EL2.

In one embodiment, the access to the capability configuration registers by each exception level can be controlled by any suitable mechanism. The values stored in the capability configuration registers accessible to a particular exception level can then in one embodiment be changed dynamically during operation, for example when switching between VM guests that are capability aware and unaware respectively.

FIG. 6 is a table 320 illustrating how capability configuration associated with a higher configuration level may affect the capability configuration available at a lower exception level. In this table, the M bit and A bit values for a higher exception level P are shown by the fields 325, 330, and the corresponding M bit and A bit for a lower exception level Q are shown by the fields 335, 340. In this embodiment, if the M bit is cleared (i.e. at a logic zero value) for exception level P, then this means that exception level P cannot be affected by capabilities (i.e. its A bit is also treated as being cleared, irrespective of its actual value), since it is not possible for a higher exception level to be affected by capabilities, whilst unable to configure capabilities at a lower exception level. The clearing of the M bit in the field 325 for exception level P also means that the M bit for exception level Q must be cleared (i.e. zero), since it is not possible for a lower exception level to manage capabilities if a higher exception level cannot manage them. As with exception level P, the clearing of the M bit in field 335 for exception level Q means that the A bit in field 340 is also treated as clear, for all purposes other than reading the value of the field 340.

The next three entries show situations where exception level P can manage capabilities, but is itself unaffected by them. In such an arrangement, each of the upper three entries shown in the table 300 of FIG. 5 are available in association with exception level Q. Further, as mentioned earlier with reference to FIG. 5, in one embodiment, if exception level Q is the lowest exception level, it may be possible for the M bit field 335 to be cleared and the A bit field 340 to be set so that exception level Q is constrained by capabilities, but not able to manage them.

The final three entries in FIG. 6 show the situation where both the M bit and the A bit are set for exception level P. Again, the upper three entries shown in the table 300 of FIG. 5 are available for exception level Q. Further, as mentioned earlier, where exception level Q is the lowest exception level, it may also be possible for the M bit to be cleared, but for the A bit to be set.

As mentioned earlier, on exception entry or exception exit/return, a switch operation can be performed to switch from a source exception level to a target exception level. In accordance with the described embodiments, having allowed the effects of capabilities to be varied on a per exception level basis, the apparatus also provides, as part of the switch operation, a mechanism that takes into account the possibility that the effects of capabilities are different between the source exception level and the target exception level. In particular, during a switch operation from a source exception level to a target exception level, the capability configuration information in the capability configuration storage pertaining to at least one of the source exception level and the destination exception level is used to determine how the execution state of the processing circuitry is managed during the switch operation. This process will be discussed in more detail with reference to FIGS. 7A, 7B and 8.

Figure 7A:
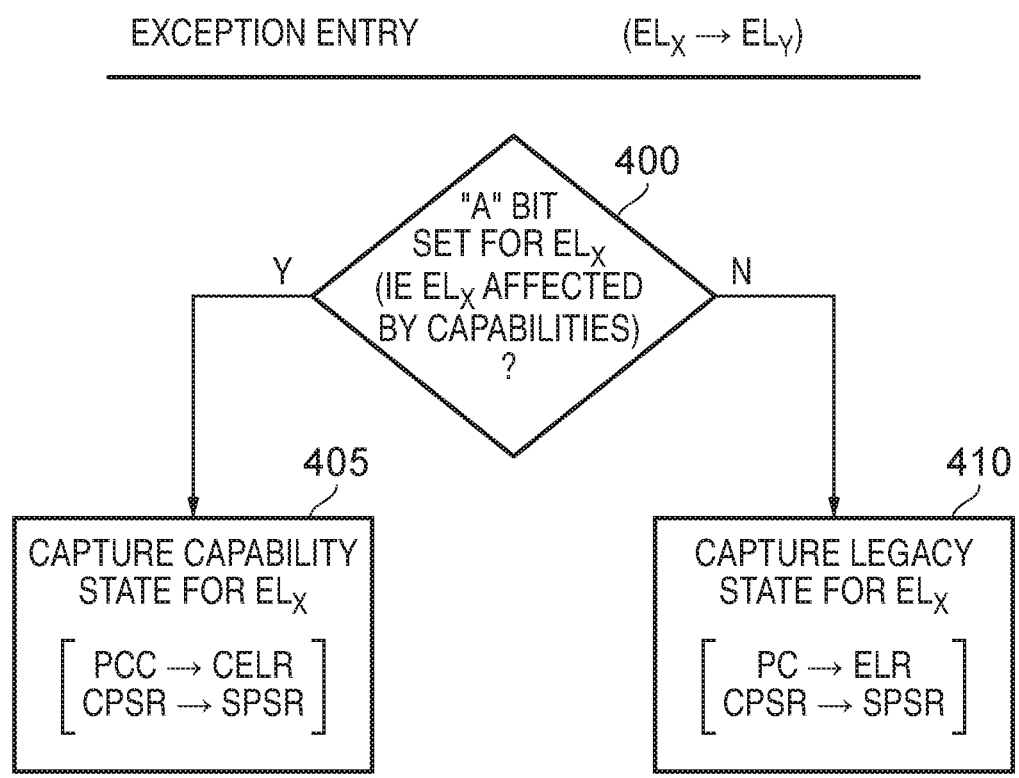
FIGS. 7A and 7B are flow diagrams illustrating how execution state of the processing circuitry is managed during an exception entry operation in accordance with one embodiment.
Figure 7B:
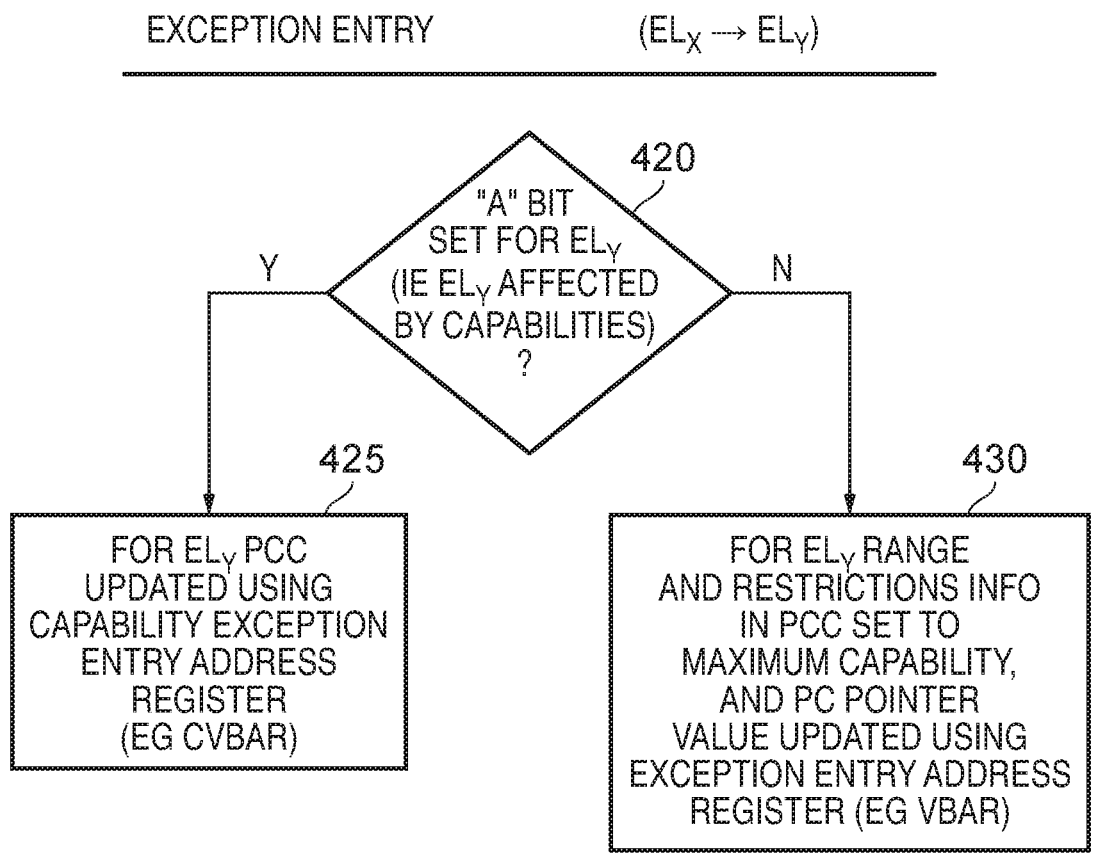

FIG. 7A illustrates the steps performed on exception entry from an exception level X to an exception level Y, in order to determine what execution state of the source exception level X should be saved. At step 400, it is determined whether the A bit is set for the source exception level X, i.e. whether exception level X is affected by capabilities. If it is, then the process proceeds to step 405 where the capability state for exception level X is captured. As discussed earlier, this will mean that the contents of the current process state register (CPSR) for exception level X is saved into a saved process state register (SPSR) 72 accessible to exception level Y. However, in addition, the current program counter capability stored within the PCC register 80 needs to be used to identify a preferred return address capability for the source exception level X. The preferred return address will be dependent on the type of exception, but will typically be the program counter value, or the program counter value plus 4 (assuming byte sized addressing, and 32-bit instructions). In addition to the preferred return address, the remaining capability information from the current program counter capability will also be copied into the return address capability generated from the PCC. In one embodiment, the return address capability generated in this manner will be stored within a dedicated return address capability register, in one particular embodiment this being the capability exception link register (CELR) 78).

However, if at step 400 it is determined that the A bit is not set, meaning that software executing at the source exception level is not affected by capabilities, then whilst it is still the case that the current process state 74 for the exception level X is saved into the saved process state 72, there is no need to save a capability to form the return address information. Instead, a preferred return address can be calculated from the program counter value 82 and saved within a suitable return address storage element, in one embodiment this being the exception link register (ELR). However, no capability information needs to be extracted from the PCC register 80 since software executing at exception level X does not have its instruction fetches constrained by capabilities.

Whilst in one embodiment a separate CELR register 78 and a separate ELR register can be provided, in an alternative embodiment the same physical structure 78 can be used in both cases. When the process shown in FIG. 7A proceeds to step 410 due to the source exception level X being unconstrained by capabilities, the preferred return address derived from the PC value can be stored within the address field of the CELR, whilst in one embodiment at least one of the remaining fields is set to a first default value. For example, with reference to the earlier mentioned tag bit discussed with reference to FIG. 3, the tag bit associated with the CELR register 78 can be cleared in such an instance to identify that the CELR does not store a valid capability, the hardware then merely referencing the portion of the CELR that stores the return address information when later retrieving that information on an exception return. In an alternative embodiment, all of the remaining fields in the CELR register 78 can be cleared, for example by zero extending the preferred return address stored into the CELR register 78 at step 410.

In addition to determining what execution state for the source exception level X needs to be saved on exception entry, it is also necessary to determine suitable execution state for the destination exception level Y, and in particular it is necessary to determine an initial program counter capability or value to store within the PCC register 80. This process is shown schematically in FIG. 7B.

As shown, at step 420 it is determined whether the A bit is set for the destination exception level Y, i.e. whether the destination exception level is affected by capabilities. If so, the process proceeds to step 425, where the program counter capability register 80 is updated using exception entry address capability information stored in a capability control storage element 79 shown in FIG. 1. In particular, the register 79 will store information about the appropriate address to be used on exception entry, and also associated capability information to be provided in addition with that address to form a program counter capability to be stored within the PCC register 80. The exception entry address information in the register 79 can take a variety of forms, but in one embodiment the register 79 takes the form of a capability vector base address register (CVBAR). This register provides a base address for exception entry, and the exception determines an offset from this base address in dependence on the exception type. Hence, information about the type of exception will be used to identify the appropriate address to be used to form the program counter capability loaded into the PCC register 80, with the remaining portion of the capability information for the PCC register being formed from the corresponding portion of the capability in CVBAR.

If the A bit is not set for the destination exception level Y, this means that exception level Y is not affected by capabilities, and accordingly a program counter capability is not required. Instead, it is merely necessary to form an initial program counter value to be loaded into the field 82 of the PCC register 80. Hence, in one embodiment, as shown by step 430, in this scenario the range and restrictions information in the fields 84, 86 of the PCC register 80 are set to identify a maximum capability, and the PC pointer value 82 is updated using information obtained from the exception entry address register 79. In this example, a non-capability exception entry address register is referred to, which in one embodiment may be a vector base address register (VBAR). In one particular embodiment, the VBAR register is formed in the lower 64 bits of the CVBAR register, allowing both CVBAR and VBAR registers to share the same physical storage structure.

However, in an alternative embodiment it may not be necessary to set the range and restriction information in the PCC register 80 to identify the maximum capability. For example, if the hardware is arranged so that when the current exception level is not affected by capabilities, it ignores the range and restriction information 84, 86 within the PCC register 80, then the range and restriction information may instead be left unchanged, or cleared, as desired. However, in embodiments where the entirety of the PCC register 80 is referred to in all situations, by setting the range and restrictions information to identify the maximum capability, this will ensure that the software executing in the destination exception level is unconstrained by capabilities.

Figure 8:
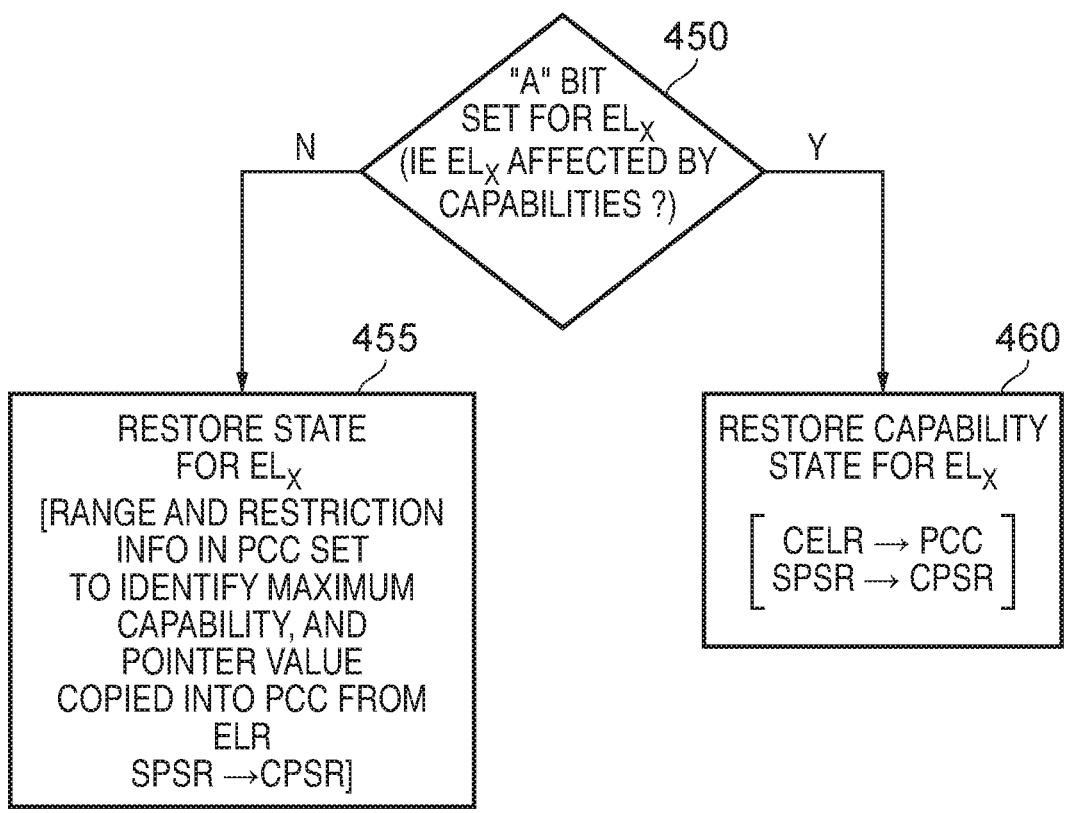
FIG. 8 is a flow diagram illustrating how execution state of the processing circuitry is managed during an exception return operation in accordance with one embodiment.

FIG. 8 is a flow diagram illustrating steps taken during return from an exception. In this instance it is assumed that the source exception level is exception level Y and the destination exception level is exception level X. At step 450, it is determined whether the A bit is set for the destination exception level X. If it is, then the process proceeds to step 460, where the capability state is restored for the destination exception level. This essentially reverses the steps taken at step 405 in FIG. 7A, by restoring the contents of the CELR register 78 into the PCC register 80, and restoring contents of the SPSR register 72 into the CPSR register 74 for exception level X.

However, if it is determined that the A bit is not set for the destination exception level X, meaning that exception level X is not affected by capabilities then the process proceeds to step 455. Here the (non-capability) state is restored for exception level X. In one embodiment, this again involves the SPSR contents being restored into the CPSR contents for exception level X. However, with regards to the PCC register 80, in one embodiment the range and restriction information is set to identify the maximum capability, and the pointer value field 82 is populated using the information from the ELR. In much the same way as discussed earlier with reference to step 430 of FIG. 7B, in some embodiments, as an alternative to setting the range and restriction information to identify the maximum capability, it may instead be possible merely to leave the range and restriction information "as is" or to clear that information, provided the hardware will not refer to that information in situations where the current exception level is not affected by capabilities.

Figure 9:
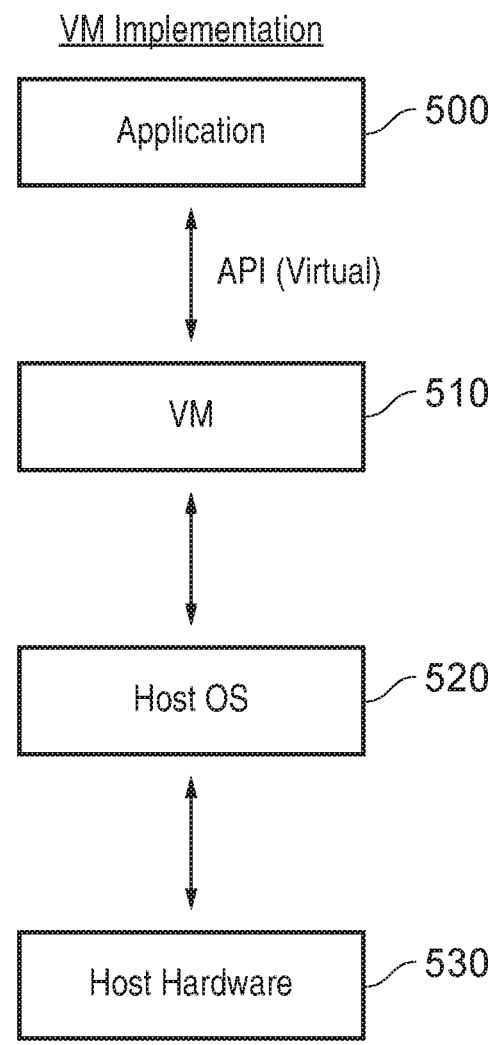
FIG. 9 illustrates a virtual machine implementation that may be used.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510. The above described techniques for managing the use of capabilities may be implemented within a virtual machine environment, using the virtual machine program 510 to model interaction with the underlying hardware. The virtual machine program can be considered to provide a hardware/software emulated environment in which to run a virtual machine, typically consisting of a guest operating system and its applications. In such embodiments, it is possible, for example, for a hypervisor operating system to have control over whether the virtual machine program (typically running at EL0) may be affected by capabilities. It may also control, in collaboration with the virtual machine program, whether the guest operating system and its applications may be affected by/manage capabilities.

It will be appreciated that the above-described embodiments provide a very flexible mechanism for managing the use of capabilities, by enabling capability configuration information to be specified on a per exception level basis, and with a mechanism being provided to control switching between exception levels to take into account the possible differences in how capabilities are used between the source and target exception levels. Hence, on entry to and exit from exception levels, a switch operation can be performed that takes into account the capability configuration information pertaining to at least one of the source exception level and the destination exception level when determining how execution state of the processing circuitry is managed during the switch operation.

Through the provision of this level of configurability, this enables various different use models to be supported at each of the different exception levels. For example, at one or more exception levels, legacy software may be executed that is neither affected by capabilities nor manages capabilities for itself or lower levels.

As another example, at certain higher exception levels, such as a hypervisor exception level, it is possible to run code that is not restricted by capabilities, but while still allowing that software to be capability aware so that it can control/switch capabilities that are used to constrain lower exception levels.

As another example, at one or more exception levels, the software may be both affected by capabilities and able to manage capabilities used to constrain lower exception levels (and optionally the same exception level).

Further, the switching mechanism ensures that on exception entry or exception exit, the required information can be captured and restored, taking into account whether the source and/or destination exception levels are affected by capabilities or not.

In one embodiment, if it is desired to use capabilities at a low exception level, all higher exception levels must be aware of capabilities to the extent that they can manage those capabilities for lower levels, because those higher exception levels will be responsible for context switching in respect of lower exception levels. However, through use of the above-described techniques, it is still possible for one or more of the higher exception levels to itself be unconstrained by capabilities. This can give rise to performance benefits in such situations, since capability checking is not required for any software that is allowed to run unconstrained by capabilities.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
  processing circuitry to execute instructions, the processing circuitry being operable at a plurality of exception levels, each exception level having different software execution privilege;
  a plurality of capability storage elements accessible to the processing circuitry and arranged to store capabilities used to constrain operations performed by the processing circuitry when executing said instructions; and
  capability configuration storage to identify capability configuration information for each of said plurality of exception levels, for each exception level the capability configuration information identifying at least whether the operations performed by the processing circuitry when executing instructions at that exception level are constrained by said capabilities; and
  during a switch operation from a source exception level to a destination exception level, the capability configuration information in the capability configuration storage pertaining to at least one of the source exception level and the destination exception level is used to determine how execution state of the processing circuitry is managed during the switch operation.

2. An apparatus as claimed in claim 1, wherein the processing circuitry is arranged to use an exception mechanism to transition between said plurality of exception levels, and when exception entry causes the switch operation from the source exception level to the destination exception level, the processing circuitry is arranged to determine return address information to be preserved for the source exception level with reference to the capability configuration information pertaining to the source exception level.

3. An apparatus as claimed in claim 2, wherein:
  when the capability configuration information pertaining to the source exception level identifies that the operations performed by the processing circuitry when executing instructions at said source exception level are constrained by said capabilities, the processing circuitry is arranged to determine said return address information with reference to a program counter capability, and to store the return address information as a capability within one of said capability storage elements designated as a return address capability storage element; and
  otherwise, the processing circuitry is arranged to determine said return address information with reference to a program counter value, and to store the return address information as a return address value within a return address storage element.

4. An apparatus as claimed in claim 3, wherein the return address storage element is formed by a field within the return address capability storage element.

5. An apparatus as claimed in claim 4, wherein when the return address information is stored as the return address value within the return address storage element, at least one remaining field of the return address capability storage element is set to a first default value.

6. An apparatus as claimed in claim 5, wherein all remaining fields are set to the first default value by zero extending the return address value.

7. An apparatus as claimed in claim 1, wherein the processing circuitry is arranged to use an exception mechanism to transition between said plurality of exception levels, and when exception entry causes the switch operation from the source exception level to the destination exception level, the processing circuitry is arranged to determine an initial execution state of the processing circuitry for the destination exception level with reference to the capability configuration information pertaining to the destination exception level.

8. An apparatus as claimed in claim 7, wherein:
  when the capability configuration information pertaining to the destination exception level identifies that the operations performed by the processing circuitry when executing instructions at said destination exception level are constrained by said capabilities, the processing circuitry is arranged to generate an initial program counter capability for the destination exception level using exception entry address capability information stored in a capability control storage element; and
  otherwise, the processing circuitry is arranged to generate an initial program counter value using exception entry address information stored in a control storage element.

9. An apparatus as claimed in claim 8, wherein said control storage element is formed by a field within said capability control storage element.

10. An apparatus as claimed in claim 8, further comprising:
  a program counter capability storage element to store the initial program counter capability;
  the processing circuitry being arranged, when generating the initial program counter value instead of the initial program counter capability, to store the initial program counter value within a first field of the program counter capability storage element.

11. An apparatus as claimed in claim 10, wherein when the processing circuitry stores the initial program counter value within the first field of the program counter capability storage element, remaining fields of the program counter capability storage element are arranged to be set to a second default value.

12. An apparatus as claimed in claim 11, wherein said second default value causes the program counter capability storage element to represent a maximum capability for the processing circuitry, to ensure that the processing circuitry's use of the initial program counter value is unconstrained by content of the program counter capability storage element.

13. An apparatus as claimed in claim 1, wherein the processing circuitry is arranged to use an exception mechanism to transition between said plurality of exception levels, and when exception exit causes the switch operation from the source exception level to the destination exception level, the processing circuitry is arranged to determine a return execution state of the processing circuitry for the destination exception level with reference to the capability configuration information pertaining to the destination exception level.

14. An apparatus as claimed in claim 13, wherein:
when the capability configuration information pertaining to the destination exception level identifies that the operations performed by the processing circuitry when executing instructions at said destination exception level are constrained by said capabilities, the processing circuitry is arranged to generate a return program counter capability for the destination exception level using return address information stored as a capability within one of said capability storage elements designated as a return address capability storage element; and
otherwise, the processing circuitry is arranged to generate a return program counter value using return address information stored as a return address value within a return address storage element.

15. An apparatus as claimed in claim 14, further comprising:
a program counter capability storage element to store the return program counter capability;
the processing circuitry being arranged when generating the return program counter value instead of the return program counter capability, to store the return program counter value within a first field of the program counter capability storage element.

16. An apparatus as claimed in claim 15, wherein when the processing circuitry stores the return program counter value within the first field of the program counter capability storage element, remaining fields of the program counter capability storage element are arranged to be set to a third default value.

17. An apparatus as claimed in claim 16, wherein said third default value causes the program counter capability storage element to represent a maximum capability for the processing circuitry, to ensure that the processing circuitry's use of the return program counter value is unconstrained by the content of the program counter capability storage element.

18. An apparatus as claimed in claim 1, wherein:
said plurality of exception levels are arranged as a hierarchy of exception levels, such that software executing at a higher exception level in said hierarchy has ability to constrain at least some behaviour of software executing at a lower exception level in said hierarchy; and
for each exception level the capability configuration information is arranged to further identify whether software executing at that exception level is able to manage capabilities used to constrain the operations performed by the processing circuitry when executing instructions at at least one of the same exception level and a lower exception level.

19. An apparatus as claimed in claim 18, wherein:
when the capability configuration information for a particular exception level identifies that that particular exception level is unable to manage capabilities, then at least when the particular exception level is an exception level other than a lowest exception level the capability configuration information for said particular exception level will further identify that the operations performed by the processing circuitry when executing instructions at said particular exception level are unconstrained by said capabilities.

20. An apparatus as claimed in claim 19, wherein:
when the capability configuration information for said particular exception level identifies that that particular exception level is unable to manage capabilities, the capability configuration information for each lower exception level than said particular exception level will identify that that lower exception level cannot manage capabilities and, at least when that lower exception level is an exception level other than a lowest exception level, will further identify that the operations performed by the processing circuitry when executing instructions at said lower exception level are unconstrained by said capabilities.

21. A non-transitory computer-readable storage medium storing a virtual machine computer program comprising program instructions to control a host data processing apparatus to provide an instruction execution environment corresponding to the apparatus according to claim 1.

22. A method of managing use of capabilities within an apparatus having processing circuitry to execute instructions, the processing circuitry being operable at a plurality of exception levels, each exception level having different software execution privilege, and a plurality of capability storage elements accessible to the processing circuitry and arranged to store capabilities used to constrain operations performed by the processing circuitry when executing said instructions, the method comprising:
identifying, within capability configuration storage, capability configuration information for each of said plurality of exception levels, for each exception level the capability configuration information identifying at least whether the operations performed by the processing circuitry when executing instructions at that exception level are constrained by said capabilities; and
during a switch operation from a source exception level to a destination exception level, using the capability configuration information in the capability configuration storage pertaining to at least one of the source exception level and the destination exception level to determine how execution state of the processing circuitry is managed during the switch operation.

23. An apparatus comprising:
processing means for executing instructions, the processing means being operable at a plurality of exception levels, each exception level having different software execution privilege;
a plurality of capability storage element means accessible to the processing means and for storing capabilities used to constrain operations performed by the processing means when executing said instructions; and
capability configuration storage means for identifying capability configuration information for each of said plurality of exception levels, for each exception level the capability configuration information identifying at least whether the operations performed by the processing means when executing instructions at that exception level are constrained by said capabilities; and
during a switch operation from a source exception level to a destination exception level, the capability configuration information in the capability configuration storage means pertaining to at least one of the source exception level and the destination exception level is used to determine how execution state of the processing means is managed during the switch operation.

* * * * *